Patented Sept. 15, 1953

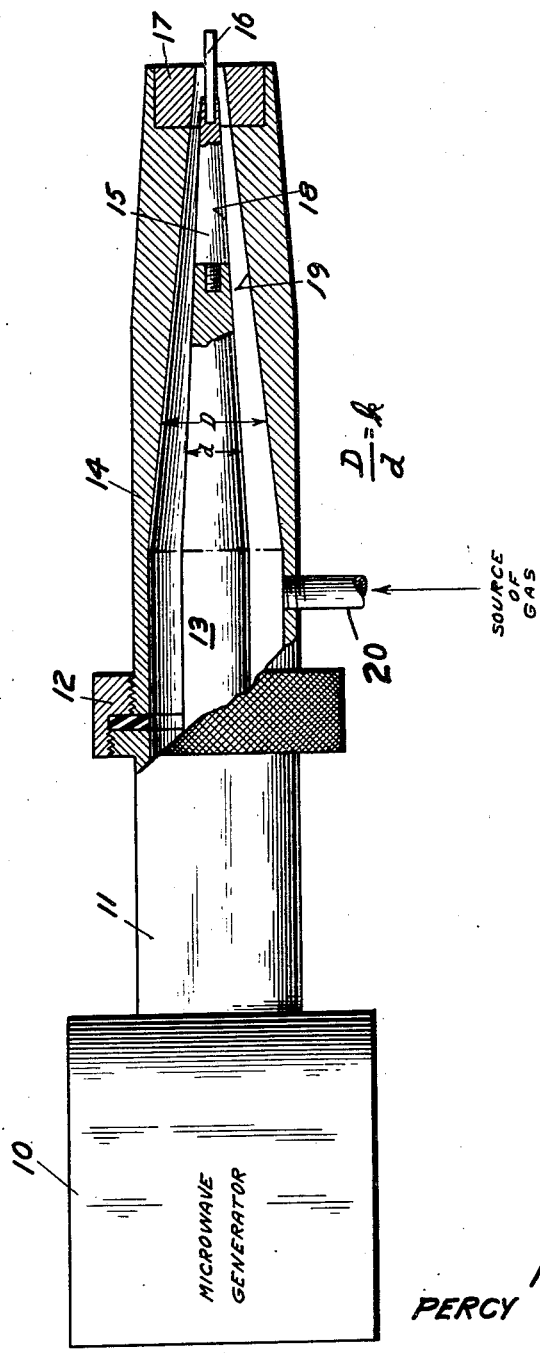

2,652,475

UNITED STATES PATENT OFFICE 2,652,475

MICROWAVE APPARATUS

Percy L. Spencer, West Newton, Mass., assignor to Raytheon Manufacturing Company, Newton, Mass., a corporation of Delaware Application June 7, 1950, Serial No. 166,736

3 Claims. (Cl. 219—15)

1

This invention relates to microwave apparatus, and more particularly to apparatus of the general character specified which is useful in atomic gas welding, dissociation of diatomic gases, or the like.

Atomic gas welding has heretofore been accomplished by passing a jet of hydrogen gas through an electric arc to convert the hydrogen from molecular to atomic form, the conversion constituting an endothermionic reaction. Immediately beyond the arc, the atoms recombined in an exothermionic reaction to provide a flame very much hotter than that of the oxy-hydrogen or oxy-acetylene torch. The arc employed for the conversion of the gas from molecular to atomic form was established by alternating current of low frequency, for example, 60 cycles per second.

It has been found that such an arc is not particularly stable. It is easily extinguished and, requiring frequent restriking, soon wears out the electrodes between which it is established. Furthermore, the flame produced by such known apparatus is of such short lengths and of such extended area of distribution that the work being operated upon must be held close to the ends of the electrodes. As a result, it is difficult to direct the flame to a selected region of the work, this being especially disadvantageous where the character of the work requires precise control over the region of contact between the flame and the work.

It is, therefore, among the objects of the present invention to eliminate the foregoing shortcomings by providing apparatus which results in the production of a stable flame of relatively great length which is confined to a relatively restricted area of distribution.

These and other objects of the present invention, which will become more apparent as the detailed description thereof progresses, are attained, broadly, in the following manner.

It has been found that, if electromagnetic energy of a frequency in the microwave region of the spectrum is employed for the dissociation of the gas in welding apparatus of the general type above referred to, the flame resulting from the recombination to molecular form is easily maintained, and is of such shape and proportions as to be readily directed where desired. For this purpose, the present invention contemplates the use of a microwave generator, such as a magnetron, the output of which is coupled to a transmission line of the coaxial conductor type, the outer ends of the inner and outer conductors constituting the electrodes between which the high-frequency arc is struck. It has further been found that the gas to be dissociated may conveniently be conveyed to the region of the discharge by feeding the same through the space between the coaxially disposed transmission line conductors. For this purpose, the source of molecular gas is coupled directly to the transmission line.

In the accompanying specification there shall be described, and in the annexed drawing shown, an illustrative embodiment of the microwave apparatus of the present invention. It is, however, to be clearly understood that the present invention is not to be limited to the exact details herein shown and described for purposes of illustration only, inasmuch as changes therein may be made without the exercise of invention and within the true spirit and scope of the claims hereto appended.

In said drawing, the single figure is a partial side elevation, partial longitudinal section of welding apparatus assembled in accordance with the present invention.

Referring now more in detail to the aforesaid illustrative embodiment of the present invention, with particular reference to the drawing illustrating the same, the numeral 10 designates a microwave energy generator, for example, a magnetron oscillator. The output of said generator is coupled, by means, for example, of a conventional coupling loop (not shown), to a coaxial transmission line 11. The latter, in turn, is coupled, as at 12, to an auxiliary transmission line, also of the coaxial conductor type, and including an inner conductor 13 and a concentric outer conductor 14. It will be understood that, although the line 11 has been referred to as a coaxial transmission line, a hollow wave guide may be employed instead, with a proper transformer coupling between such a wave guide and the auxiliary transmission line including the conductors 13 and 14.

The inner conductor 13 preferably includes a portion 15 made, for example, of molybdenum, to arrest heat conduction from the arc back toward the generator 10. The outer end of the molybdenum portion 15 supports a short rod 16 made, preferably, of tungsten, this rod constituting one of the arc-supporting electrodes.

The outer conductor 14 is preferably provided, at the outer end thereof, with an annular ring 17 of molybdenum, this insert constituting the other arc-supporting electrode and being resistant to destruction by the heat of the arc itself.

In order to attain a suitable spacing between the arc-supporting electrode portions 16 and 17 of the conductors 13 and 14 and still maintain a proper impedance match between the output of the generator 10 and the arc-supporting ends of the conductors 13 and 14, said conductors are tapered, as at 18 and 19, toward the outer ends, the respective tapers being at such a rate that the ratio of the inner diameter D of the outer conductor 14 to the outer diameter $d$ of the inner conductor 15 is maintained at a constant $k$ throughout the length of the taper.

The apparatus is completed by coupling to the conductor 14 a pipe 20 adapted to communicate with a source of dissociable gas, such as hydrogen, nitrogen, etc., the gas flowing in the space between the conductors 13 and 14 to the arc region intermediate the electrodes 16 and 17.

This completes the description of the aforesaid illustrative embodiment of the present invention. It will be noted from all of the foregoing that a simple gas welding torch has been provided which, as stated in earlier portions of this specification, provides a stable, relatively long, and relatively thin flame admirably adapted to welding, particularly, precision welding requiring highly elevated temperatures.

Other objects and advantages of the device of the present invention will readily occur to those skilled in the art to which the same relates.

What is claimed is:

1. In combination: a source of microwave electromagnetic energy; a source of dissociable gas; and a transmission line, including inner and outer coaxial conductors, coupled to said source of energy and coupled to said source of gas; said inner conductor extending out beyond the end of said outer conductor; said transmission line conveying said energy to the outer ends of said conductors to establish an arc discharge therebetween, and conveying said gas to the region of said discharge.

2. In combination: a source of microwave electromagneic energy; a source of dissociable gas; and a transmission line, including inner and outer coaxial conductors, coupled to said source of energy and coupled to said source of gas; said conductors being tapered inwardly in the direction of the outer ends thereof, with the ratio of the inner diameter of the outer conductor to the outer diameter of the inner conductor constant throughout said taper; said transmission line conveying said energy to the outer ends of said conductors to establish an arc discharge therebetween, and conveying said gas to the region of said discharge.

3. In combination: a source of microwave electromagnetic energy; a source of dissociable gas; and a transmission line, including inner and outer coaxial conductors, coupled to said source of energy and coupled to said source of gas; said conductors being tapered inwardly in the direction of the outer ends, with the length of said taper being several times greater than the maximum dimension of the inside of said outer conductor; said transmission line conveying said energy to the outer ends of said conductors to estabilsh an arc discharge therebetween, and conveying said gas to the region of said discharge.

PERCY L. SPENCER.

References Cited in the file of this patent

UNITED STATES PATENTS

| Number | Name | Date |
|---|---|---|
| 1,911,033 | Nagashev | May 23, 1933 |
| 1,932,448 | Clavier | Oct. 31, 1933 |
| 2,127,229 | McRae | Aug. 16, 1938 |
| 2,425,830 | Ross | Aug. 19, 1947 |
| 2,465,102 | Joy | Mar. 22, 1949 |
| 2,506,626 | Zottu | May 9, 1950 |
| 2,550,089 | Schlesman | Apr. 24, 1951 |
| 2,587,331 | Jordan | Feb. 26, 1952 |